United States Patent
Goldacker et al.

(10) Patent No.: US 7,348,398 B2
(45) Date of Patent: Mar. 25, 2008

(54) METHOD FOR SEPARATING TRANSITION METALS FROM POLYMERS

(75) Inventors: Thorsten Goldacker, Wiesbaden (DE); Klaus Koralewski, Riedstadt (DE)

(73) Assignee: Roehm GmbH & Co. KG, Darmstadt (DE)

( * ) Notice: Subject to any disclaimer, the term of this patent is extended or adjusted under 35 U.S.C. 154(b) by 192 days.

(21) Appl. No.: 10/544,805

(22) PCT Filed: Jan. 24, 2004

(86) PCT No.: PCT/EP2004/000593

§ 371 (c)(1),
(2), (4) Date: Aug. 8, 2005

(87) PCT Pub. No.: WO2004/083261

PCT Pub. Date: Sep. 30, 2004

(65) Prior Publication Data

US 2006/0142545 A1    Jun. 29, 2006

(30) Foreign Application Priority Data

Mar. 19, 2003    (DE) .................. 103 12 278

(51) Int. Cl.
*C08F 6/00*    (2006.01)
(52) U.S. Cl. .................. 528/480; 264/176.1; 264/219; 502/150; 525/285
(58) Field of Classification Search ............ 264/176.1, 264/219; 502/150; 525/285; 528/480
See application file for complete search history.

(56) References Cited

U.S. PATENT DOCUMENTS

| 3,423,384 A | 1/1969 | Hagemeyer, Jr. et al. |
| 2002/0128405 A1* | 9/2002 | Matyjaszewski et al. ... 526/129 |

FOREIGN PATENT DOCUMENTS

| CN | 1210111 | 3/1999 |
| DE | 100 15 583 | 11/2000 |
| EP | 1058567 | 12/2000 |
| EP | 1 132 410 | 9/2001 |
| GB | 1 024 653 | 3/1966 |
| JP | 53 030759 | 3/1978 |
| WO | 00/56795 | 9/2000 |
| WO | 01/62803 | 8/2001 |
| WO | 01/84424 | 11/2001 |
| WO | 02/28916 | 4/2002 |

OTHER PUBLICATIONS

U.S. Appl. No. 10/544,805, filed Aug. 8, 2005, Goldacker et al.
U.S. Appl. No. 10/579,843, filed May 17, 2006, Goldacker et al.

* cited by examiner

*Primary Examiner*—Terressa Boykin
(74) *Attorney, Agent, or Firm*—Oblon, Spivak, McClelland, Maier & Neustadt, P.C.

(57) ABSTRACT

The invention relates to a method for separating transition metals from polymers. According to the invention, a solid polymer containing transition metals is treated with an extracting agent, the duration of the treatment and the extraction temperature being selected in such a way that the transition metal content is reduced by at least 30 wt. %.

18 Claims, No Drawings

METHOD FOR SEPARATING TRANSITION METALS FROM POLYMERS

BACKGROUND OF THE INVENTION

1. Field of the Invention

The present invention relates to a process for removal of transition metals from polymers.

2. Description of the Background

Purification of polymers is known per se. By way of example, low-molecular-weight organic constituents can be removed from mixtures by extraction processes, by bringing solid polymers into contact with extractants. WO 02/28916 describes, by way of example, removal of oligomers from ethylene-acrylate copolymers. These low-molecular-weight organic by-products are produced during the synthesis and can in particular cause odor impairment and taste impairment in packaging for food or drink.

However, the proportion of these constituents present is relatively high, for example from 0.2 to 3.7% by weight, and this removal process is not quantitative, but gives different results, depending on the extractant used. These results make it obvious that at least 0.04% by weight of low-molecular-weight compounds remain in the polymer even after an extraction process. In comparison with this, the amount of the transition metal complex present in the polymer is in the range of about 400-500 ppm.

For this reason, it should be obvious that a very small proportion of this type could hardly be reduced by an extraction process described in WO 02/28916.

Accordingly, no inorganic metal compound is mentioned in WO 02/28916. The same applies to the specification of application EP 1 058 567, in which extraction of polymer granules is described for removal of oligomers and monomers which are produced during condensation of nylon-6.

Other processes are known for removal of transition metals from polymers. By way of example, a copper catalyst has been used during synthesis of polyphenylene oxide, and is removed after the polymerization process via aqueous liquid-liquid extraction of the solution (cf. Ullmanns Encyclopedia of Industrial Chemistry, 1992 5th edition, vol. 26 a, 606 et seq.) However, a disadvantage of this method is that many polar polymers act as a suspension stabilizer and inhibit separation of the two liquid phases. These processes cannot therefore be used for purification of polymethyl methacrylate, for example.

The process known as ATRP (atom transfer radical polymerization) is an important process for preparation of a wide variety of polymers, such as PMMA and polystyrene, with relatively good control of their structure, the molecular weight, and the molecular weight distribution. These processes use transition metals, such as copper, for controlled polymerization of vinyl compounds. This process permits the construction of very particular polymers which are very difficult or impossible to prepare by traditional polymerization processes. A disadvantage of this process is the use of transition metals which have to be removed from the polymerization mixture after the polymerization process.

Various methods have been proposed for this. On the laboratory scale, the method most often used for removal of the catalyst, such as copper, is adsorption on aluminum oxide followed by precipitation of the polymer with polar precipitants, such as methanol. This type of process is industrially disadvantageous for various reasons.

Firstly, the form in which the polymer is present after the precipitation process is non-uniform, for example granules, and this makes removal of precipitants and work-up difficult. Furthermore, the precipitation process produces large amounts of the precipitant mixed with the solvents and with other constituents to be removed, such as residual monomer, and complicated separation of these is required.

There are also known processes in which the solid catalyst is removed from the liquid polymer-containing solution. Here, the catalyst itself becomes insoluble, for example via oxidation, or is bound, before or after the polymerization process, to a solid adsorbent or to a swollen but insoluble resin. The liquid polymer-containing phase is separated from insoluble material via filtration or centrifuging. By way of example, CN 1210111 describes a process where an adsorbent (in particular activated charcoal or aluminum oxide) is added to the polymer solution after the ATRP process and then is removed via filtration. A disadvantage here is that complete removal can be achieved only via very large amounts of adsorbent, because the content of transition metals in the reaction mixture is relatively small. Furthermore, these adsorbents are relatively expensive and require complicated renewal processes.

DE 100 15 583 describes another ATRP process which uses a non-polar solvent for the polymerization process. The transition metal catalyst becomes insoluble via oxidation during or after the reaction, and can be removed by filtration. These processes are generally suitable only for preparation of relatively non-polar polymers. If polar polymers are prepared, polymethyl methacrylate for example, these polymers are then insoluble in the solvent. This process can therefore only be used for very specific polymers.

Quirk and collaborators describe a further process for the removal of transition metal catalysts (cf. Liou, S.; Malaba, D.; Brittain, W.; Lee, Y.; Quirk, R. Poly. Prep. (Am. Chem. Soc., Div. Poly. Chem.) 1999, 40(2), 380). This process uses an ATRP catalyst with a specific ligand, the catalyst complex therefore being soluble during the polymerization process, but, in contrast, becoming insoluble under the conditions of purification, thus permitting removal of the transition metal catalyst. A disadvantage of this process is the use of very specific ligands, which are firstly expensive and secondly are also not capable of general use.

EP 1 132410 describes a two-stage purification process. In a first step, the insoluble portion of the catalyst is removed via centrifuging. In a subsequent step, residual transition metal is then bound via an ion exchanger resin, which is removed by filtration. A disadvantage here again is the use of specific adsorbents, which are relatively expensive when used on an industrial scale.

There are also known methods which carry out the polymerization process with a catalyst previously immobilized on a solid or on a gel (cf. WO 00/56795, WO 01/062803, Brittain and collaborators, Polymer Prepr. (Am. Chem. Society., Div. Poly. Chem.) 2002, 43(2), 275). A particular disadvantage of this method is the high costs generated by the catalyst immobilized on a solid. Furthermore, reactions of this type are relatively slow, because the ends of the chains have difficulty in reaching the catalyst center.

A feature of the abovementioned processes is that a liquid polymer solution is removed from the catalyst present in insoluble form. However, removal of undivided or swollen particles from a viscous solution is technically complicated and associated with many disadvantages. By way of example, high rotation rates are needed during centrifuging, and the required separation time here is long. During filtration the filter often blocks, and high pressure has to be exerted here because the viscosity is high. Industrial-scale conduct of these processes is therefore possible only at very high cost.

Furthermore, WO 01/84424 describes a process which binds the initiator to a solid support. The polymerization process produces polymer chains pendant from these solid supports, the chains being separated by cleavage after removal of the catalyst solution. The main disadvantage is the large number of uneconomic steps in the process, in addition to the actual polymerization process. Furthermore, this process can succeed only with filtration and precipitation, which are attended by the abovementioned disadvantages.

SUMMARY OF THE INVENTION

In view of the prior art, it is now an object of the present invention to provide a process capable of industrial use for removal of transition metals from polymers. At the same time, it should be possible to carry out the novel process in a simple manner and at low cost.

Another object of the present invention was to provide a process which can be carried out in known plants.

In particular, there should be no steps involving the centrifuging or filtration of high-viscosity solutions during removal of the transition metals.

Another object consisted in providing a process which can purify granules at low cost.

These objects, and also other objects which, although not explicitly stated are readily deducible or derivable from the circumstances discussed in the introduction to this specification, are achieved via processes for removal of transition metal from polymers with all of the features of patent claim 1. Advantageous embodiments of the inventive process are protected by the claims dependent on claim 1.

DETAILED DESCRIPTION OF THE REFERRED EMBODIMENTS

Unexpectedly, a process which successfully removes transition metal from polymers and which can be carried out in a particularly simple manner is provided by removing transition metals from a solid polymer via treatment with an extractant.

At the same time, the inventive processes achieve many other advantages. Examples of these are:

The process of the present invention can be carried out at low cost.

The process of the present invention can prepare polymers with previously defined build and with controlled structure, having particularly low content of transition metal compounds.

The process can be carried out industrially.

The process of the present invention can be conducted with the aid of plants and apparatus known from the prior art.

The purification process can be carried out with relatively few problems in relation to pressure, temperature, and extractants. Good results are sometimes achieved even at moderate temperatures.

The process of the present invention is in principle suitable for a wide variety of different polymers, thus permitting downstream purification without any need to take particular precautions during the polymerization process.

The present process is characterized by the use of solid polymers, which are treated with an extractant. The term solid here characterizes the fact that the polymer substantially retains its shape in the event that it is moved, i.e. does not disintegrate via flow if it is placed on a smooth surface.

Accordingly, the polymer can also encompass solvent residues, or can be a swollen polymer or can take the form of a gel.

The process of the present invention serves for removal of transition metals from a polymer or from a mixture of polymers. Polymers prepared, by way of example, by means of ATRP methods usually encompass about 300-500 ppm of transition metals. Transition metal content here can be determined by means of AAS. However, the present process is also suitable for purification of polymers whose content of transition metals is smaller. In one particular aspect of the present invention, the polymers to be purified comprise at least 30 ppm of transition metals, preferably at least 50 ppm, and particularly preferably at least 100 ppm of transition metals.

The transition metal content of the polymer is preferably reduced by at least 30% by weight, in particular by at least 50% by weight, and particularly preferably by at least 70% by weight, via the treatment of the solid polymer with an extractant. Depending on the content of transition metals in the starting polymer, different proportions of transition metal in the purified polymer are achieved here. In one particular aspect of the present invention, the purified polymer encompasses at most 50 ppm, in particular at most 30 ppm, and particularly preferably at most 15 ppm, of transition metal.

According to the invention, the solid polymer is treated with an extractant. The extractant here should dissolve the transition metal to maximum extent, without concomitant dissolution of the polymer. The solubility of the transition metal in the most soluble oxidation state assumed in the polymerization process is preferably at least 0.01 g of transition metal in 1000 g of extractant, preferably 0.1 g/kg, and particularly preferably 0.2 g/kg.

The extractant should have the greatest possible polarity, and the maximum polarity of the solvent here depends on the polymer to be treated. As the polymer becomes less polar, the extractant can become less polar without risk of dissolution of the polymer.

The solubility of the polymer in the extractant is preferably at most 5 g of polymer per 1000 g of extractant, in particular at most 2 g/kg, and very particularly preferably at most 1 g/kg.

In one particular aspect of the present invention, ketones, nitro compounds, nitrites, or else alcohols and water are used as extractants. Among these, preference is given to the more polar compounds, in particular alcohols having from 1 to 4 carbon atoms, e.g. methanol, ethanol, propanol, and butanol, and also to water.

These compounds may be used individually or in the form of a mixture.

The formulation used for the extraction process may moreover comprise ligands, in particular chelating ligands which have nitrogen atoms.

These ligands are known per se and are described by way of example in WO 97/18247 and WO 98/40415. These compounds generally have one or more nitrogen, oxygen, phosphorus, and/or sulfur atoms by way of which the metal atom may be bound. Many of these ligands can be represented in general terms by the formula $R^{16}$-Z-$(R^{18}$-Z$)_m$—$R^{17}$, where $R^{16}$ and $R^{17}$ are independently H, $C_1$-$C_{20}$-alkyl, aryl, or heterocyclyl, these being unsubstituted or substituted. Among these substituents are alkoxy radicals and the alkylamino radicals. $R^{16}$ and $R^{17}$ may, if appropriate, form a saturated, unsaturated, or heterocyclic ring. Z is O, S, NH, $NR^{19}$, or $PR^{19}$ where $R^{19}$ is as defined for $R^{16}$. $R^{18}$ is independently a divalent group having from 1 to 40 carbon atoms, preferably from 2 to 4 carbon atoms, and this group may be linear, branched, or cyclic, for example a methylene, ethylene, propylene, or butylene group. Alkyl and aryl are as defined above. Heterocyclyl radicals are cyclic radicals having from 4 to 12 carbon atoms, where one or more of the $CH_2$ groups of the ring have been replaced by heteroatom groups, such as O, S, NH, and/or NR, the radical R being as defined above for $R^{16}$.

Another group of suitable ligands has the formula

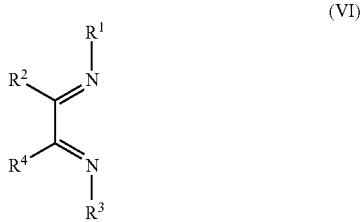

(VI)

where $R^1$, $R^2$, $R^3$, and $R^4$ independently are H, a $C_1$-$C_{20}$-alkyl radical, an aryl radical, a heterocyclyl radical and/or a heteroaryl radical, where the radicals $R^1$ and $R^2$, or $R^3$ and $R^4$, or $R^1$, $R^2$, $R^3$, and $R^4$ can together form a saturated or unsaturated ring.

Preferred ligands here are chelating ligands which contain N atoms.

Among the preferred ligands are triphenylphosphane, 2,2-bipyridine, alkyl-2,2-bipyridine, such as 4,4-di(5-nonyl)-2,2-bipyridine, 4,4-di(5-heptyl)-2,2-bipyridine, tris (2-aminoethyl)amine (TREN), N,N,N',N',N''-penta-methyldiethylenetriamine, 1,1,4,7,10,10-hexamethyltriethylenetetramine, tetramethylethylenediamine, 1,10-phenanthroline, 4,7-dimethyl-1,10-phenanthroline, 5,6-dimethyl-1,10-phenanthroline and/or 3,4,7,8-tetra-methyl-1,10-phenanthroline. Other preferred ligands are described by way of example in WO 97/47661 or EP-0 816 385. The ligands may be used individually or in the form of a mixture.

The amount of ligand can vary widely, depending on the content of transition metal. The ligand:extractant ratio is preferably in the range from 1:10 000 to 1:1, in particular from 1:1000 to 1:10, particularly preferably from 1:500 to 1:100.

In one particular embodiment, the constitution of the formulation used for the extraction process can be varied during the treatment. By way of example, the concentration of ligands, in particular of chelating ligands, can be altered. The concentration of the chelating ligands here may be smaller at the end of the treatment than in a preceding stage of the extraction process. This measure can give a surprisingly marked reduction in metal content in a very short time, without a possibility of an increased concentration of ligands remaining in the polymer. It is therefore particularly preferable that a final step carries out an extraction process with a formulation in which no ligands are present.

To improve the extraction process, very small amounts of a compound which brings about incipient swelling of the polymer may also be added to the extractant. Particular compounds among these are ketones or esters.

The duration of the treatment depends on the nature of the extractant, and also on the surface area:volume ratio of the solid polymer used. In one particular aspect of the present invention, the solid polymer is treated for from five minutes to ten days, in particular from one hour to four days, preferably from one hour to two days.

The temperature at which the treatment takes place can vary widely. The lower temperature limit is given by the melting point of the extractant. The upper limit is given by the decomposition temperature of the polymer or of the extractant, and also by the, usually increasing, solubility of the polymer in the extractant. This temperature is usually in the range from 0 to 200° C., preferably from 10 to 120° C., and particularly preferably 20 to 80° C.

The form in which the solid polymer is treated with the extractant is of subordinate significance for the success of the inventive process. Depending on the nature of the extractant, the temperature, and also the treatment time, the inventive process can even free relatively coarse solids from transition metal residues. However, it is important that the extractant penetrates into the polymer. In one particular aspect of the present invention, accordingly, the solid polymer is used in a form which has a relatively large surface area:volume ratio. Accordingly, the polymer may, by way of example, be used in the form of a solid film, to some extent cut into small pieces, in order to increase extractant accessibility, or in the form of granules. The surface area:volume ratio of the solid polymer is preferably at least 30 $m^{-1}$, in particular 50 $m^{-1}$, and particularly preferably at least 100 $m^{-1}$.

The extractant is usually used in excess, in relation to the solid polymer. The ratio by weight of extractant to solid polymer, considered over the entire purification process, is at least 2:1, preferably at least 5:1, and particularly preferably at least 10:1. The extraction here may take place in steps or continuously, and in each instance here the extractant can be renewed or freed from transition metals. By way of example, extractant can be purified through distillation.

The inventive extraction process can be improved via known methods. For example, the efficiency of the extraction process can be improved by ultrasound. The mixture can also be stirred or shaken during the extraction process, in order to accelerate the transfer of the transition metals from the solid polymer phase into the extractant.

In one particular embodiment of the present process, the polymers purified comprise polymers obtained by means of ATRP processes. Accordingly, the result is a process for preparation of polymers giving polymers with comparatively low transition metal content. In this process, ethylenically unsaturated monomers are polymerized by means of initiators which have a transferable atomic group and by means of one or more catalysts which encompass at least one transition metal, in the presence of ligands which can form a coordination compound with the metallic catalyst(s).

Monomers capable of polymerization by means of ATRP are well known. These generally have the formula

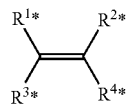

where $R^{1*}$ and $R^{2*}$ have been independently selected from the group consisting of hydrogen, halogens, CN, linear or branched alkyl groups having from 1 to 20, preferably from 1 to 6, and particularly preferably from 1 to 4, carbon atoms, which may have substitution by from 1 to (2n+1) halogen atoms, where n is the number of carbon atoms in the alkyl group (e.g. $CF_3$), α,β-unsaturated linear or branched alkenyl or, respectively, alkynyl groups having from 2 to 10, preferably from 2 to 6, and particularly preferably from 2 to 4, carbon atoms, which may have substitution by from 1 to (2n−1) halogen atoms, preferably chlorine, where n is the number of carbon atoms in the alkyl group, e.g. $CH_2=CCl-$, cycloalkyl groups having from 3 to 8 carbon atoms, which may have substitution by from 1 to (2n−1) halogen atoms, preferably chlorine, where n is the number of carbon atoms in the cycloalkyl group;

$C(=Y^*)R^{5*}$, $C(=Y^*)NR^{6*}R^{7*}$, $Y^*C(=Y^*)R^{5*}$, $SOR^{5*}$, $SO_2R^{5*}$, $OSO_2R^{5*}$, $NR^{8*}SO_2R^{5*}$, $PR^{5*}{}_2$, $P(=Y^*)R^{5*}{}_2$, $Y^*PR^5{}_2$, $Y^*P(=Y^*)R^{5*}{}_2$, $NR^{8*}{}_2$, which may have been quaternized with an additional $R^{8*}$, aryl, or heterocyclyl group, where $Y^*$ may be $NR^{8*}$, S, or O, preferably O; $R^{5*}$ is an alkyl group having from 1 to 20 carbon atoms, an alkylthio group having from 1 to 20 carbon atoms, $OR^{15}$ ($R^{15}$ being hydrogen or an alkali metal), alkoxy having from 1 to 20 carbon atoms, aryloxy, or heterocyclyloxy; $R^{6*}$ and $R^{7*}$ are independently hydrogen or an alkyl group having from 1 to 20 carbon atoms, or $R^{6*}$ and $R^{7*}$ together may form an alkylene group having from 2 to 7, preferably from 2 to 5, carbon atoms, thus forming a 3-8-membered, preferably 3-6-membered, ring, and $R^{8*}$ is hydrogen, linear or branched alkyl or, respectively, aryl groups having from 1 to 20 carbon atoms;

$R^{3*}$ and $R^{4*}$ are independently selected from the group consisting of hydrogen, halogen (preferably fluorine or chlorine), alkyl groups having from 1 to 6 carbon atoms, and $COOR^{9*}$, where $R^{9*}$ is hydrogen, an alkali metal, or an alkyl group having from 1 to 40 carbon atoms, or $R^{1*}$ and $R^{3*}$ together may be a group of the formula $(CH_2)_{n'}$, which may have substitution by from 1 to 2n' halogen atoms or by $C_1$-$C_4$-alkyl groups, or together may generate the formula $C(=O)-Y^*-C(=O)$, where n' is from 2 to 6, preferably 3 or 4, and $Y^*$ is as defined above; and where at least 2 of the radicals $R^{1*}$, $R^{2*}$, $R^{3*}$ and $R^{4*}$ are hydrogen or halogen.

Among these monomers are vinyl esters, such as vinyl formate, vinyl acetate, vinyl propionate, vinyl isobutyrate, vinyl pivalate, vinyl 2-ethylhexanoate, vinyl esters of saturated branched monocarboxylic acids having from 9 to 10 carbon atoms in the acid radical, vinyl esters of longer-chain saturated or unsaturated fatty acids, e.g. vinyl laurate, vinyl stearate, and also vinyl esters of benzoic acid and of substituted derivatives of benzoic acid, e.g. vinyl p-tert-butylbenzoate;

styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, such as monochlorostyrenes, dichlorostyrenes, tribromostyrenes, and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles, and hydrogenated vinylthiazoles, vinyloxazoles, and hydrogenated vinyloxazoles;

vinyl and isoprenyl ethers;

maleic acid derivatives, such as maleic anhydride, methylmaleic anhydride, maleimide, methylmaleimide;

monomers having N-functional groups, in particular (meth)acrylamide, allyl carbamate, acrylonitrile, N-methylol (meth)acrylamide, allyl N-methylolcarbamate, and also the N-methylol esters, N-alkyl ethers, or Mannich bases of N-methylol(meth)acrylamide or of allyl N-methylolcarbamate, acrylamidoglycolic acid, methyl acrylamidomethoxyacetate, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl(meth)acrylamide, N-(3-hydroxy-2,2-dimethylpropyl)methacrylamide, ethylimidazolidone methacrylate, N-vinylformamide, N-vinylpyrrolidone;

vinyl compounds which have an acetophenone and/or benzophenone group, preferred acetophenone and/or benzophenone monomers being described in EP-A-0 417 568;

vinyl compounds having an acid group, and also their water-soluble salts, such as vinylsulfonic acid, 1-acrylamido-2-methylpropanesulfonic acid, and vinylphosphonic acid, and also ethylenically unsaturated mono- and dicarboxylic acids, in particular acrylic acid, methacrylic acid, maleic acid, fumaric acid and itaconic acid;

and (meth)acrylates.

The term (meth)acrylates encompasses methacrylates and acrylates, and also mixtures of the two. These monomers are well known. Among them are (meth)acrylates which derive from saturated alcohols, e.g. methyl(meth)acrylate, ethyl (meth)acrylate, propyl(meth)acrylate, butyl(meth)acrylate, pentyl(meth)acrylate, hexyl(meth)acrylate, 2-ethylhexyl (meth)acrylate, heptyl(meth)acrylate, 2-tert-butylheptyl (meth)acrylate, octyl(meth)acrylate, 3-isopropylheptyl (meth)acrylate, nonyl(meth)acrylate, decyl(meth)acrylate, undecyl(meth)acrylate, 5-methylundecyl(meth)acrylate, dodecyl(meth)acrylate, 2-methyldodecyl(meth)acrylate, tridecyl(meth)acrylate, 5-methyltridecyl(meth)acrylate, tetradecyl(meth)acrylate, pentadecyl(meth)acrylate, hexadecyl (meth)acrylate, 2-methylhexadecyl(meth)acrylate, heptadecyl(meth)acrylate, 5-isopropylheptadecyl(meth)acrylate, 4-tert-butyloctadecyl(meth)acrylate, 5-ethyloctadecyl(meth)acrylate, 3-isopropyloctadecyl(meth)acrylate, octadecyl (meth)acrylate, nonadecyl(meth)acrylate, eicosyl(meth)acrylate, cetyleicosyl(meth)acrylate, stearyleicosyl(meth)acrylate, docosyl(meth)acrylate, and/or eicosyltetratriacontyl(meth)acrylate;

amides and nitriles of (meth)acrylic acid, e.g. (meth)acrylamide, N-methylol(meth)acrylamide, N-(3-dimethylaminopropyl)(meth)acrylamide, N-(diethylphosphono)(meth)acrylamide, 1-methacryloylamido-2-methyl-2-propanol, N-(3-dibutylaminopropyl)(meth)acrylamide, N-tert-butyl-N-(diethylphosphono)(meth)acrylamide, N,N-bis(2-diethylaminoethyl)(meth)acrylamide, 4-methacryloylamido-4-methyl-2-pentanol, acrylonitrile, methacryloylamidoacetonitrile, N-(methoxymethyl)(meth)acrylamide, N-(2-hydroxyethyl)(meth)acrylamide, N-(dimethylaminoethyl)(meth)acrylamide, N-methyl-N-phenyl(meth)acrylamide, N,N-diethyl(meth)acrylamide, N-acetyl(meth)acrylamide, N-methyl(meth)acrylamide, N,N-dimethyl(meth)acrylamide, N-isopropyl(meth)acrylamide;

aminoalkyl(meth)acrylates, such as tris(2-(meth)acryloxyethyl)amine, N-methylformamidoethyl(meth)acrylate, 3-diethylaminopropyl(meth)acrylate, 4-dipropylaminobutyl(meth)acrylate, 2-ureidoethyl(meth)acrylate;

other nitrogen-containing (meth)acrylates, such as N-((meth)acryloyloxyethyl)diisobutyl ketimine, 2-(meth)acryloyloxyethylmethylcyanamide, cyanomethyl(meth)acrylate;

aryl(meth)acrylates, such as benzyl(meth)acrylate or phenyl (meth)acrylate, where each of the aryl radicals may be unsubstituted or have up to four substituents;

carbonyl-containing methacrylates, such as 2-carboxyethyl (meth)acrylate, N-(2-methacryloyloxyethyl)-2-pyrrolidinone, N-(3-methacryloyloxypropyl)-2-pyrrolidinone, carboxymethyl(meth)acrylate, N-methacryloylmorpholine, oxazolidinylethyl(meth)acrylate, N-(methacryloyloxy)formamide, acetonyl(meth)acrylate, N-methacryloyl-2-pyrrolidinone;

cycloalkyl(meth)acrylates, such as 3-vinylcyclohexyl(meth)acrylate, bornyl(meth)acrylate;

hydroxyalkyl(meth)acrylates, such as 3-hydroxypropyl (meth)acrylate, 3,4-dihydroxybutyl(meth)acrylate, 2-hydroxyethyl(meth)acrylate, 2-hydroxypropyl(meth)acrylate;

glycol di(meth)acrylates, such as 1,4-butanediol(meth)acrylate, methacrylates of ether alcohols, e.g. tetrahydrofurfuryl(meth)acrylate, vinyloxyethoxyethyl(meth)acrylate, methoxyethoxyethyl(meth)acrylate, 1-butoxypropyl (meth)acrylate, 1-methyl-(2-vinyloxy)ethyl(meth)acrylate, cyclohexyloxymethyl(meth)acrylate, methoxymethoxyethyl(meth)acrylate, benzyloxymethyl(meth)acrylate, furfuryl(meth)acrylate, 2-butoxyethyl(meth)acrylate, 2-ethoxyethoxymethyl(meth)acrylate, 2-ethoxyethyl(meth)acrylate, allyloxymethyl(meth)acrylate, 1-ethoxybutyl(meth)acrylate, methoxymethyl(meth)acrylate, 1-ethoxyethyl(meth)acrylate, ethoxymethyl(meth)acrylate;

methacrylates of halogenated alcohols, e.g. 2,3-dibromopropyl(meth)acrylate, 4-bromophenyl(meth)acrylate, 1,3-dichloro-2-propyl(meth)acrylate, 2-bromoethyl(meth)acrylate, 2-iodoethyl(meth)acrylate, chloromethyl(meth)acrylate;

oxiranyl(meth)acrylates, such as 10,11-epoxyundecyl(meth)acrylate, 2,3-epoxycyclohexyl(meth)acrylate, 2,3-epoxybutyl(meth)acrylate, 3,4-epoxybutyl(meth)acrylate, glycidyl(meth)acrylate;

phosphorus-, boron-, and/or silicon-containing methacrylates, such as 2-(dibutylphosphono)ethyl(meth)acrylate, 2,3-butylene(meth)acryloylethyl borate, 2-(dimethylphosphato)propyl(meth)acrylate, methyldiethoxy(meth)acryloylethoxysilane, 2-(ethylenephosphito)propyl (meth)acrylate, dimethylphosphinomethyl(meth)acrylate, dimethylphosphonoethyl(meth)acrylate, diethyl(meth)acryloylphosphonate, diethylphosphatoethyl(meth)acrylate, dipropyl(meth)acryloyl phosphate;

sulfur-containing methacrylates, such as ethylsulfinylethyl (meth)acrylate, 4-thiocyanatobutyl(meth)acrylate, ethylsulfonylethyl(meth)acrylate, thiocyanatomethyl(meth)acrylate, methylsulfinylmethyl(meth)acrylate, bis((meth)acryloyloxyethyl)sulfide;

tri(meth)acrylates, such as trimethylolpropane tri(meth)acrylate;

heterocyclic(meth)acrylates, such as 2-(1-imidazolyl)ethyl (meth)acrylate, 2-(4-morpholinyl)ethyl(meth)acrylate, and 1-(2-methacryloyloxyethyl)-2-pyrrolidone.

The monomers set out above may be used individually or in the form of a mixture. Among the monomers set out above, (meth)acrylates are preferred. In one particular aspect of the present invention, the polymers purified to remove transition metals comprise polymers obtainable via polymerization of formulations which encompass at least 40% by weight, in particular at least 60% by weight, of (meth)acrylates, particular preference among these being given to (meth)acrylates having from 1 to 6 carbon atoms in the alcohol radical, e.g. methyl methacrylate, ethyl acrylate, and butyl acrylate.

In an ATRP process, the monomers set out above are polymerized by means of initiators which have a transferable atomic group. These initiators can generally be described via the formula $Y-(X)_m$, where Y is the core molecule, which is assumed to form free radicals, X is a transferable atom or a transferable atomic group, and m is a whole number in the range from 1 to 10, depending on the functionality of the group Y.

If m>1, the various transferable atomic groups X can be different. If the functionality of the initiator is >2, the product is star polymers. Preferred transferable atoms or transferable atomic groups are halogens, such as Cl, Br, and/or I.

As mentioned above, the group Y is assumed to form free radicals which serve as initiator molecule, and this radical forms an adduct with the ethylenically unsaturated monomers. The group Y therefore preferably has substituents which can stabilize free radicals.

Among these substituents are aryl and/or heteroaryl groups, —CN, —COR, and —CO$_2$R, where each R is an alkyl or aryl radical.

Alkyl radicals are saturated or unsaturated, branched or linear hydrocarbon radicals having from 1 to 40 carbon atoms, e.g. methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyl, heptadecyl, octadecyl, nonadecyl, eicosyl, cetyleicosyl, docosyl, and/or eicosyltetratriacontyl.

Aryl radicals are cyclic, aromatic radicals which have from 6 to 14 carbon atoms in the aromatic ring. These radicals may have substitutions. Examples of substituents are linear and branched alkyl groups having from 1 to 6 carbon atoms, such as methyl, ethyl, propyl, butyl, pentyl, 2-methylbutyl, or hexyl; cycloalkyl groups, such as cyclopentyl and cyclohexyl; aromatic groups, such as phenyl or naphthyl; amino groups, ether groups, ester groups and also halides.

Among the aromatic radicals are phenyl, xylyl, toluyl, naphthyl, or biphenyl.

The term "heteroaryl" characterizes a heteroaromatic ring system, where at least one CH group has been replaced by N or two adjacent CH groups have been replaced by S, O, or NH, e.g. a radical of thiophene, furan, pyrrole, thiazole, oxazole, pyridine, pyrimidine, or benzo[a]furan, which likewise may have the abovementioned substituents.

An initiator capable of use in ATRP processes may be any compound which has one or more atoms or atomic groups which is transferable by a free-radical route under the conditions of polymerization in the ATRP process.

Suitable initiators encompass those of the following formulae:

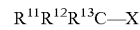

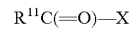

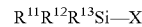

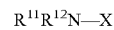

$(R^{11})_nP(O)_m—X_{3-n}$ $(R^{11})_nP(O)_m—X_{3-n}$, and $(R^{11})(R^{12}O)P(O)_m—X$, where X has been selected from the group consisting of Cl, Br, I, $OR^{10}$, [where $R^{10}$ is an alkyl group of from 1 to 20 carbon atoms, where each hydrogen atom independently may have been replaced by a halide, preferably fluoride or chloride, alkenyl of from 2 to 20 carbon atoms, preferably vinyl, alkynyl of from 2 to 10 carbon atoms, preferably acetylenyl, phenyl, which may have substitution by from 1 to 5 halogen atoms or alkyl groups having from 1 to 4 carbon atoms, or aralkyl (aryl-substituted alkyl where the aryl group is phenyl or substituted phenyl and the alkyl group has from 1 to 6 carbon atoms, an example being benzyl);] $SR^{14}$, $SeR^{14}$, $OC(=O)R^{14}$, $OP(=O)R^{14}$, $OP(=O)(OR^{14})_2$, $OP(=O)OR^{14}$, $O—N(R^{14})_2$, $S—C(=S)N(R^{14})_2$, CN, NC, SCN, CNS, OCN, CNO, and $N^3$, where $R^{14}$ is an aryl group or a linear or branched alkyl group having from 1 to 20, preferably from 1 to 10, carbon atoms, where two $R^{14}$ groups, if present, may together form a 5-, 6-, or 7-membered heterocyclic ring; and $R^{11}$, $R^{12}$, and $R^{13}$ have been selected independently from the group consisting of hydrogen, halogens, alkyl groups having from 1 to 20, preferably from 1 to 10, and particularly preferably from 1 to 6 carbon atoms, cycloalkyl groups having from 3 to 8 carbon atoms, $R^{8*}_3Si$, $C(=Y^*)R^{5*}$, $C(=Y^*)NR^{6*}R^{7*}$, where $Y^*$, $R^{5*}$, $R^{6*}$, and $R^{7*}$ are as defined above, COCl, OH, (one of the radicals $R^{11}$, $R^{12}$, and $R^{13}$ preferably being OH), CN, alkenyl or, respectively, alkynyl groups having from 2 to 20 carbon atoms, preferably from 2 to 6 carbon atoms, and particularly preferably allyl or vinyl, oxiranyl, glycidyl, or alkylene or, respectively, alkenylene groups having from 2 to 6 carbon atoms, substituted with oxiranyl or glycidyl, aryl, heterocyclyl, aralkyl, aralkenyl (aryl-substituted alkenyl, aryl being as defined above and alkenyl being vinyl substituted with one or two $C_1$-$C_6$-alkyl groups and/or with halogen atoms, preferably with chlorine), alkyl groups having from 1 to 6 carbon atoms, where from one to all of the hydrogen atoms, preferably one, have been substituted by halogen, (preferably fluorine or chlorine, if one or more hydrogen atoms have been replaced, and preferably fluorine, chlorine, or bromine, if one hydrogen atom has been replaced), alkyl groups having from 1 to 6 carbon atoms, substituted with from 1 to 3 substituents (preferably 1) selected from the group consisting of $C_1$-$C_4$-alkoxy, aryl, heterocyclyl, $C(=Y^*)R^{5*}$ (where $R^{5*}$ is as defined above), $C(=Y^*)NR^{6*}R^{7*}$ (where $R^{6*}$ and $R^{7*}$ are as defined above), oxiranyl, and glycidyl; (it is preferable that not more than 2 of the radicals $R^{11}$, $R^{12}$, and $R^{13}$ are hydrogen, and it is particularly preferable that at most one of the radicals $R^{11}$, $R^{12}$, and $R^{13}$ is hydrogen); m=0 or 1; and m=0, 1, or 2.

Among the particularly preferred initiators are benzyl halides, such as p-chloromethylstyrene, α,α'-dichloro-xylene, α,α'-dibromoxylene, and hexakis(α-bromomethyl)-benzene, benzyl chloride, benzyl bromide, 1-bromo-1-phenylethane, and 1-chloro-1-phenylethane; carboxylic acid derivatives halogenated at the α-position, e.g. propyl 2-bromopropionate, diethyl meso-2,5-dibromoadipate, 1,2-bis(bromopropionyloxy)-ethane, dimethyl 2,6-dibromoheptanoate, methyl 2-chloropropionate, ethyl 2-chloropropionate, methyl 2-bromopropionate, ethyl 2-bromoisobutyrate; tosyl halides, such as p-toluenesulfonyl chloride; alkyl halides, such as tetrachloromethane, tribromomethane, 1-vinylethyl chloride, 1-vinylethyl bromide; and halogen derivatives of phosphoric esters, e.g. dimethyl phosphoryl chloride.

The concentration generally used of the initiator is in the range from $10^{-4}$ mol/L to 3 mol/L, preferably in the range from $10^{-3}$ mol/L to $10^{-1}$ mol/L, and particularly preferably in the range from $5*10^{-2}$ mol/L to $5*10^{-1}$ mol/L, with no intended resultant restriction. If all of the monomer is converted, the initiator:monomer ratio determines the molecular weight of the polymer.

This ratio is preferably in the range from $10^{-4}$:1 to 0.5:1, particularly preferably in the range from $1*10^{-3}$:1 to $5*10^{-2}$:1.

Catalysts which encompass at least one transition metal are used to carry out the polymerization process. Use may be made here of any transition metal compound which can generate a redox cycle with the initiator or with the polymer chain which comprises a transferable atomic group. In these cycles, the transferable atomic group and the catalyst reversibly generate a compound, the oxidation state of the transition metal being increased or reduced during the process. It is assumed that free radicals are liberated and, respectively, trapped during the process, thus keeping the concentration of free radicals very low. However, it is also possible that the addition reaction of the transition metal compound onto the transferable atomic group permits or facilitates the insertion of ethylenically unsaturated monomers into the Y—X bond or $Y(M)_z$—X bond, where Y and X are as defined above, and M indicates the monomers, while z is the degree of polymerization.

Preferred transition metals here are Cu, Fe, Co, Cr, Ne, Sm, Ni, Mn, Mo, Ag, Zn, Pd, Pt, Re, Rh, Ir, In, Yd, and/or Ru, used in suitable oxidation states. These metals may be used individually or else in the form of a mixture. It is assumed that these metals catalyze the redox cycles of the polymerization process, an example of the active redox pair being $Cu^+/Cu^{2+}$ or $Fe^{2+}/Fe^{3+}$. Accordingly, the form in which the metal compounds are added to the reaction mixture is that of halides, such as chloride or bromide, or of alkoxide, hydroxide, oxide, sulfate, phosphate, or hexafluorophosphate, or trifluoro(meth)ansulfate. Among the preferred metallic compounds are $Cu_2O$, CuBr, CuCl, CuI, $CuN_3$, CuSCN, CuCN, $CuNO_2$, $CuNO_3$, $CuBF_4$, $Cu(CH_3COO)Cu(CF_3COO)$, $FeBr_2$, $RuBr_2$, $CrCl_2$, and $NiBr_2$.

However, it is also possible to use compounds in higher oxidation states, e.g. CuO, $CuBr_2$, $CuCl_2$, $CrCl_3$, and $Fe_2O_3$, $FeBr_3$. In these instances, the reaction can be initiated with the aid of traditional free-radical generators, such as AIBN. Here, the transition metal compounds are first reduced, since they are reacted with the free radicals generated from the traditional free-radical generators. This process is reverse ATRP, as described by Wang and Matyjaszewski in Macromolecules (1995), vol. 28, pp. 7572-7573.

The transition metals may moreover be used for catalysis in the form of metal in oxidation state zero, in particular in a mixture with the abovementioned compounds, as described by way of example in WO 98/40415. In these instances, the rate of the reaction can be increased. It is assumed that the result here is to increase the concentration of catalytically active transition metal compound by comproportionation of transition metals in a high oxidation state with metallic transition metal.

The molar ratio of transition metal to initiator is generally in the range from 0.0001:1 to 10:1, preferably in the range from 0.001:1 to 5:1, and particularly preferably in the range from 0.01:1 to 2:1, with no intended resultant restriction.

The ATRP polymerization process takes place in the presence of ligands which can form a coordination compound with the metallic catalyst(s). These ligands serve, inter alia, to increase the solubility of the transition metal compound. Another important function of the ligands consists in eliminating formation of stable organometallic compounds. This is particularly important because these stable compounds would not polymerize under the reaction conditions selected. Furthermore, it is assumed that the ligands facilitate abstraction of the transferable atomic group.

A detailed description of these ligands as additive during the extraction process has previously been given, and is incorporated here by way of reference.

These ligands may form coordination compounds in situ with the metal compounds, or may initially be prepared in the form of coordination compounds and then added to the reaction mixture.

The ratio of ligand to transition metal depends on the denticity of the ligand and on the coordination number of the transition metal. The molar ratio is generally in the range from 100:1 to 0.1:1, preferably from 6:1 to 0.1:1, and particularly preferably from 3:1 to 0.5:1, with no intended resultant restriction.

The monomers, the transition metal catalysts, the ligands, and the initiators are selected as a function of the desired polymer solution. It is assumed that a high reaction rate constant for the reaction between the transition metal-ligand complex and the transferable atomic group is significant for narrow molecular weight distribution. If the rate constant of this reaction is too low, the concentration of free radicals becomes too high, and the typical termination reactions responsible for broad molecular weight distribution therefore occur. By way of example, the rate of exchange depends on the transferable atomic group, on the transition metal, on the ligands, and on the anion of the transition metal compound. Useful indications concerning selection of these components can be found by the person skilled in the art in WO 98/40415, by way of example.

The polymerization process may be carried out with or without solvent. The term solvent here is to be interpreted widely. Among these are in particular hexane, toluene, ethyl acetate, tetrahydrofuran, benzene, and cyclohexane.

In one particular aspect of the present invention, solvents used for the polymerization process have high polarity. These solvents generally have a dielectric constant of at least 6, preferably at least 8, and particularly preferably at least 11, measured at 25° C.

Compounds particularly preferably used as solvents are carbonyl compounds, in particular ketones which have from 3 to 21 carbon atoms. Among these are acyclic, aliphatic ketones, such as acetone, 2-butanone, 2-pentanone, 3-pentanone, 2-hexanone, 2-heptanone, 4-methyl-2-pentanone; cyclic, aliphatic ketones, such as cyclohexanone, 2-methylcyclohexanone, 3-methylcyclo-hexanone, or 4-methylcyclohexanone; aromatic ketones, such as acetophenone, 2-methylacetophenone, 3-methyl-acetophenone. These aromatic solvents moreover encompass nitro compounds having from 1 to 10 carbon atoms. Among these are nitromethane, nitroethane, nitropropane, nitrobenzene, and dinitrobenzene. Use may also be made of nitrites, such as acetonitrile, propiononitrile, and benzonitrile.

It is also possible to use alcohols, among which are in particular cyclohexanol, benzyl alcohol, propanol, and hexanol.

These compounds may be used individually or in the form of mixtures with one another, or else with other solvents.

The proportion of organic compounds with dielectric constants of at least 10 is preferably from 10 to 100 percent by volume, based on the entire content of solvents.

The proportion of the monomers in the reaction mixture used for the polymerization process is generally from 10 to 100% by weight, based on the entire reaction mixture, and is preferably from 20 to 80% by weight, and particularly preferably from 40 to 60% by weight, based on the entire reaction mixture.

Particularly preferred polymers which may be purified by the present process are soluble in the above-mentioned carbonyl compounds.

Once the polymerization reaction has ended, solvents, and also monomer residues, are removed from the mixture. This can be achieved in a manner known per se. The solvent is generally removed from the mixture via heating at reduced pressure. There are also known industrial processes for this on an industrial scale deriving from the solvent polymerization sector. In one particular aspect of the present invention, the resultant solid is extruded in an extruder to give granules. It is preferable here that compounds which reduce the melting point of the polymer are added to the polymer solution. Substances suitable as plasticizers of this type generally have a molecular weight of from 50 to 20 000. Examples of suitable compounds are alkyl citrates, alkyl phthalates, alkyl sebacates, alkyl adipates, or the various ethylene glycols and/or propylene glycols, and their derivatives. Examples of suitable plasticizers are tributyl citrate, triethyl citrate, triethyl acetyl citrate, diethyl phthalate, dibutyl phthalate, di-2-ethylhexyl phthalate, diisononyl phthalate, diethyl sebacate, dibutyl sebacate, di-2-ethylhexyl adipate, glycol, diethylene glycol, polyethylene glycols, e.g. polyethylene glycols of from 200 to 20 000 g/mol ($M_n$), diethylene glycol monoethyl ether, propylene glycol or polypropylene glycols, e.g. polypropylene glycol of from 425 to 3500 g/mol ($M_n$). These compounds may be used individually or in combination with one another, and the starting amounts of the plasticizers are selected in such a way that the granulated solid comprises from 1 to 35% by weight, preferably from 2 to 20% by weight, and particularly preferably from 5 to 15% by weight, of the plasticizer.

This method can significantly lower the processing temperature, permitting avoidance of thermal decomposition of the ligands. This method generally reduces the extrusion temperature to 140° C., preferably 120° C. The extrusion process generates granules whose diameter is generally at most 2 cm, preferably at most 1 cm.

The invention is illustrated in further detail below via inventive examples and comparative examples, but there is no intention that the invention be restricted to the examples.

INVENTIVE EXAMPLE 1

The monomeric methyl methacrylate (MMA) used, and also the solvents toluene and methyl isobutyl ketone (MIBK, analytical grade), were filtered through an aluminum oxide layer prior to use and freed from oxygen by flushing with argon. The polymerization process was carried out under argon, using, as catalyst, a complex derived from CuBr and N,N,N',N"-pentamethyldiethylene-triamine (=PMDETA) generated in situ.

The following starting materials were heated to 90° C. in a 1.5 l glass reactor:

| | |
|---|---|
| 500.000 g | of toluene, |
| 500.000 g | of MMA, |
| 0.963 g | of PMDETA, |
| 0.495 g | of CuBr, |
| 2.000 g | of diethyl meso-2,5-dibromoadipate (DEMDBA). |

The heterogeneous mixture was polymerized for 6 h at 90° C. The resultant viscous PMMA mixture (solids content about 43.2%) was used as parent mixture for purification experiment.

INVENTIVE EXAMPLE 2

The mixture obtained in example 1 was cast to give a film thickness of about 0.5 mm and dried. The film was cut into pieces of size about 1 cm$^2$.

About 3.0 g (15%) of the comminuted PMMA film, 17 g of methanol (85%), and 0.003 g (0.1%, based on PMMA) of PMDETA were used as initial charge in a 50 ml round-bottomed flask, heated to 60° C., and extracted at 60° C. for 2 h, with stirring (magnetic stirrer). After 2 hours, the supernatant extractant was removed by decanting and renewed. This extraction process was carried out 5 times in total. The polymer specimens were dried in vacuo at 100° C. for 4 hours in order to determine Cu content by atomic absorption spectroscopy (AAS).

The untreated polymer comprised about 830 μg/g of copper. The film comprised about 34 μg/g of Cu after 5 extraction processes (in each case 2 h at about 60° C.)

COMPARATIVE EXAMPLE 1

40 g of the mixture obtained in example 1 were diluted in a 250 ml round-bottomed flask with 40 g of toluene. 80 g of deionized water were added to the mixture and mixed for 5 minutes with a magnetic stirrer. The stirrer was then switched off. Extraction was impossible because the result was a dispersion exhibiting no phase separation.

INVENTIVE EXAMPLE 3

Example 1 was substantially repeated, but using 500.000 g of methyl isobutyl ketone as solvent. This gave a solution which was polymerized as stated in example 1.

810 g (95%) of the undiluted PMMA mixture were then treated with 18.4 g of polyethylene glycol (5%), and homogenized for 30 min (roller bed). The entire mixture was then devolatilized in a laboratory extruder at 120° C. and granulated, the diameter of the granules being about 0.3 mm.

3 g (15%) of the resultant granules were then subjected to a total of 5 extraction processes, each carried out for about 2 hours, each using 17 g (85%) of methanol and 0.003 g of PMDETA (0.1%, based on PMMA). After each extraction process the extraction solution was renewed.

The polymer specimens were dried in vacuo at 100° C. for 4 hours to determine Cu content by atomic absorption spectroscopy (AAS).

Prior to the extraction process, the original granules comprised about 740 μg/g of copper. The granules comprised 23 μg/g of copper after 5 extraction steps, each carried out for 2 hours at 60° C.

What is claimed is:

1. A process for removal of transition metals from polymers, comprising:
   extracting transition metals present in a solid polymer via treatment with an extractant which comprises alcohols having from 1 to 4 carbon atoms and/or water, wherein the solid polymer is obtained via polymerization of alkly(meth)acrylates or of mixtures which comprise alkyl(meth)acrylates.

2. The process as claimed in claim 1, wherein the solid polymer has a surface area:volume ratio of 50 m$^-$ prior to the treatment with the extractant.

3. The process as claimed in claim 1, wherein said transition metal is an element selected from the group consisting of Cu, Fe, Co, Cr, Re, Sm, Mn, Mo, Ni, Ag, Zn, Pd, Pt, Re, Rh, Ir, In, Yb, and Ru.

4. The process as claimed in claim 1, wherein the solid polymer comprises at least 100 ppm of transition metal, prior to the treatment.

5. The process as claimed in claim 1, wherein chelating ligands which comprise N atoms are added to the extractant.

6. The process as claimed in claim 1, wherein the treatment is carried out at a temperature in the range from 0 to 120° C.

7. The process as claimed in claim 1, wherein the treatment is carried out for a period in the range from 1 hour to 4 days.

8. The process as claimed in claim 1, wherein the constitution of the mixture used for the extraction process is varied during the treatment.

9. The process as claimed in claim 8, wherein at least one chelating ligand is added to the extractant, the concentration of the chelating ligands being varied during the course of the treatment.

10. The process as claimed in claim 9, wherein the concentration of the chelating ligands at the end of the treatment is smaller than in a preceding stage of the extraction process.

11. The process as claimed in claim 1, wherein the metal content of the polymer is reduced by at least 70% by weight.

12. The process as claimed in claim 1, wherein the solid polymer is granulated before carrying out the treatment with an extractant.

13. The process as claimed in claim 12, wherein the solid polymer is granulated via extrusion.

14. The process as claimed in claim 13, wherein prior to the extrusion process, a compound which lowers the melting point of the polymer is added to the polymer.

15. The process as claimed in claim 1, wherein the solid polymer is obtained via a process in which ethylenically unsaturated monomers are polymerized by means of initiators which have a transferable atomic group and by means of one or more catalysts which encompass at least one transition metal, in the presence of ligands which can form a coordination compound with the metallic catalyst(s).

16. The process as claimed in claim 15, wherein said metallic catalyst is a member selected from the group consisting of $Cu_2O$, CuBr, CuCl, CuI, $CuN_3$, CuSCN, CuCN, $CuNO_2$, $CuNO_3$, $CuBF_4$, $Cu(CH_3COO)$, and $Cu(CF_3COO)$.

17. The process as claimed in claim 15, wherein at least one chelating ligand is used which comprises N atoms.

18. The process as claimed in claim 15, wherein said initiator is comprised of Cl, Br, I, SCN, and/or $N_3$.

* * * * *